Jan. 15, 1974   D. H. HODGKINS   3,785,970
WATER SEPARATOR
Filed Dec. 27, 1971   2 Sheets-Sheet 1

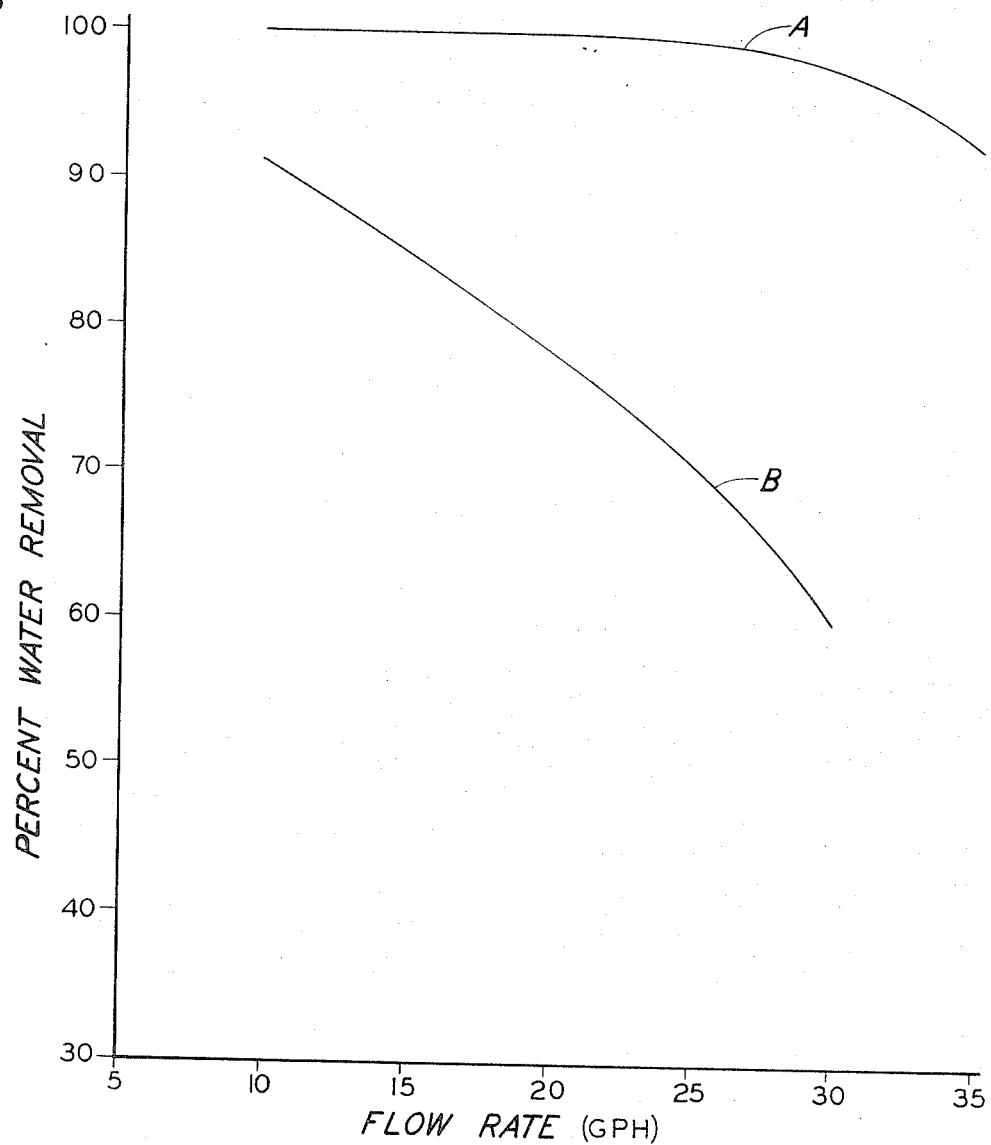

United States Patent Office 3,785,970
Patented Jan. 15, 1974

3,785,970
WATER SEPARATOR
David H. Hodgkins, Manchester, Conn., assignor to
Stanadyne, Inc., Hartford, Conn.
Filed Dec. 27, 1971, Ser. No. 212,356
Int. Cl. B01d 13/00, 33/00
U.S. Cl. 210—23                                  14 Claims

ABSTRACT OF THE DISCLOSURE

A water separator for a diesel fuel supply system provides a plenum chamber housing a water separator barrier made of ribbed-knit porous cloth in the form of a cylindrical sock having a closed end. The open end of the sock is sealed around the inlet passage of the separator so that flow maintains the sock inflated for flow through the entire porous surface area of the sock. The pores of the sock are smaller, when relaxed, than the water droplets to be separated and the sock is made of nylon which is not wettable by water. The pores of the sock are expandable as required to accommodate varying flow rates with a minimum change in pressure differential across the sock and to permit the passage of large wax particles under low temperature operating conditions to prevent clogging.

BACKGROUND OF THE INVENTION

This invention relates to a separator for removing immiscible liquid impurities from a suspension and more particularly to a water separator for removing suspended particles of water from a petroleum base liquid fuel.

Water may be entrained in petroleum base fuel as free water suspended in droplet or particulate form, in emulsion, or in solution. The removal of dissolved water from fuel is unnecessary since all fuels contain a quantity of dissolved water, the amount depending mainly upon the ambient temperature and humidity of the air and dissolved water is uniformly distributed in the fuel and is not believed to create any difficulties. However, since temperature fluctuations change the capacity of fuel to hold water in solution, there is an accumulation of undissolved water in fuel storage tanks due to the precipitation of water from solution as a result of temperature changes. The process of precipitation of water from solution involves the coalescing of finely divided water particles, which are formed in the transition of water from a dissolved to an undissolved state, into larger particles which finally settle out because their density is greater than the fuel.

It is important to remove the undissolved water particles suspended in the fuel before the fuel passes through the filter medium for removing solid particulate contaminants. If the entrance face of the filter medium is covered with water or if the pores thereof are at least partially filled, its capacity is reduced and the pressure drop across the filter is increased. The removal of water from a fuel system also prevents filter and fuel line freeze up.

Moreover, it is essential that a water separator for a fuel supply system for a diesel engine pass solid particles of a larger size than the droplets of water to be removed. Under low temperature conditions when the suspended droplets of water are removed from the fuel by freezing, the wax components of diesel fuel coagulate and may form wax particles as large as 1/16 inch and it is important that a water separator pass such particles to prevent the clogging thereof and avoid engine stalling.

SUMMARY OF THE INVENTION

It is an object of this invention to provide an improved water separator of high efficiency for removing suspended water particles from a petroleum base liquid fuel. Included in this object is the provision of a water separator which will pass solid particulate matter suspended in the liquid.

It is also an object of this invention to provide a porous water separator medium having pore elasticity to permit the passage of solid particles contained in a liquid fuel which are of a larger size than the water droplets to be removed from the fuel.

Another object of this invention is the provision of a method of and apparatus for the removal of immiscible liquid impurities from a suspension.

Other objects will be in part obvious and in part pointed out more in detail hereinafter.

A better understanding of the invention will be obtained from the following detailed description and the accompanying drawings of an illustrative application of the invention.

The illustrated embodiment of the present invention involves a closed water collecting bowl in which a sock made of porous cloth has its open end sealed around the inlet passage so that the flow of fuel through the sock maintains the sock in inflated condition and there is a uniform minimal pressure drop across the entire porous surface area of the sock. The pores of the sock are expandable to reach a state of equilibrium in which pores are of a size to create the pressure drop required to accommodate the established flow rate of fuel. The expandability of the pores also permits the passage of filterable particulate matter suspended in the fuel so that the water separator is not clogged by large wax particles of fuel under low temperature operating conditions.

The sock is preferably formed of a fiber which is not wettable by the droplets to be separated and is formed by a ribbed knit to provide small pores with maximum expandability.

BRIEF DESCRIPTION OF THE DRAWINGS

FIG. 5 is a graphical representation showing the comparative efficiency of water separation of the water separator.

DESCRIPTION OF A PREFERRED EMBODIMENT

Figure 1:
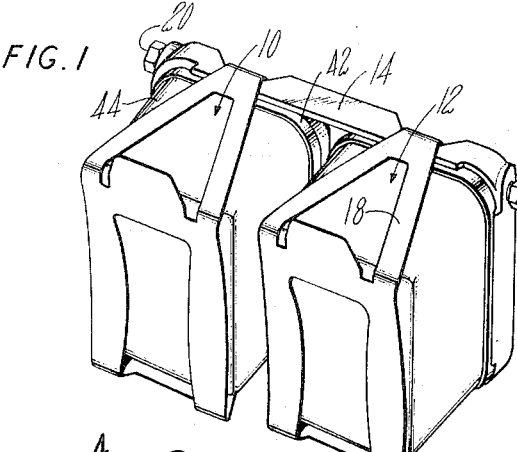
FIG. 1 is a perspective view of a water separator and filter assembly illustrative of the present invention.

Referring now particularly to the drawings, there is shown in FIG. 1 a filter assembly for a fuel supply system for a diesel engine comprising a water separator 10 and a solid particle filter 12 mounted on a common base 14. The base is provided with an inlet 20 which is connected to a supply tank for a petroleum base liquid fuel and an outlet 22 through which the filter liquid fuel is delivered to the fuel injection system of the associated engine.

Figure 2:
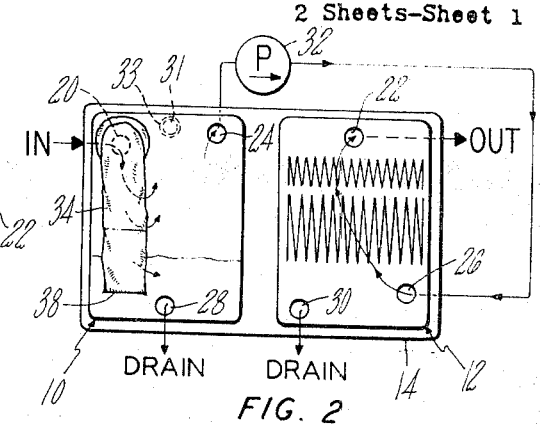
FIG. 2 is a partially schematic top view of the assembly of FIG. 1 showing the flow of fuel through the assembly.

As shown in FIG. 2, the water separator 10 and the filter 12 are connected in series with the outlet 24 of the water separator 10 connected to the inlet 26 of the filter 12. The base 14 is provided with a pair of drain ports 28, 30 from which the water and other contaminants collected in the bottoms of the water separator 10 and the filter 12, respectively, may be drained.

The filter 12, which is of the type disclosed in U.S. Pat. No. 3,591,004 issued on July 6, 1971, prevents the passage of solid contaminants into the fuel system where it would have a serious adverse effect on the functioning of the associated engine. The filter 12 is provided with three triangularly disposed ported abutments and is biased into sealed engagement with ports 22, 26, 30 of the base by resilient clamp 18.

As illustrated, the water separator 10 has the same external size and shape as the filter 12, and is mounted on the base 14 by triangularly disposed ported abutments 21, 25, 29 and is biased into engagement with ports 20, 24, 28, respectively, of the base.

Figure 3:
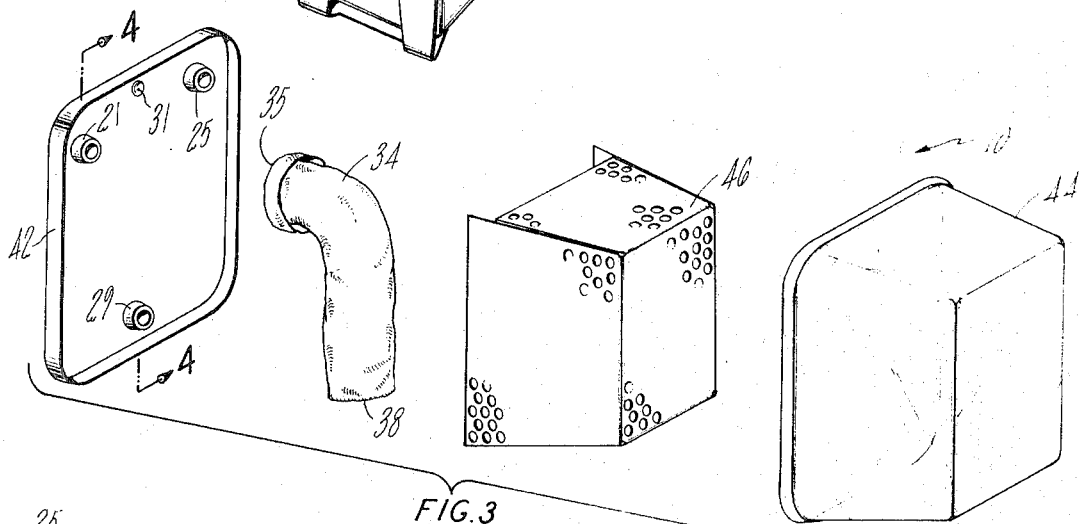
FIG. 3 is a perspective exploded view of the water separator of FIG. 1.
Figure 4:
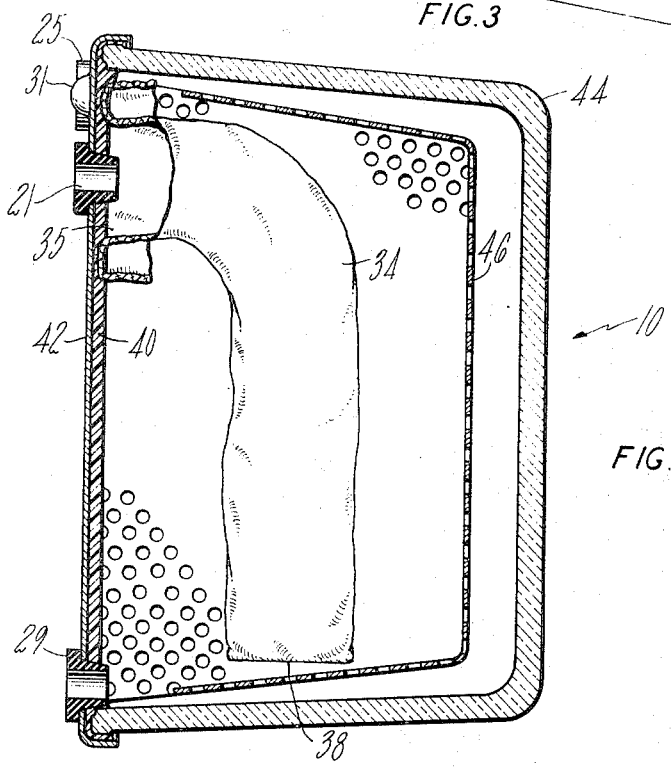
FIG. 4 is a cross sectional view taken along lines 4—4 of FIG. 3.

The use of identical parts for fabricating the housing for water separator 10 and for filter 12 result in a saving of manufacturing costs. However, since the water separator 10 will not satisfactorily remove solid contaminants in the fuel, it is essential that the water separator 10 not be mistakenly substituted in place of the filter 12. To avoid such a mistake, there is provided, as shown in FIGS. 2, 3, and 4, a dimple 31 which projects from the cover plate 42 of the water separator 10. This projection 31 is reinforced by being filled with adhesive 40 so that it cannot be deformed. The base 14 is provided with a recess 33 for receiving the dimple 31. Since a similar recess is not provided on the mounting portion of the base for receiving the filter 12, a water separator 10, if mounted as a substitute for the filter 12, would not sealingly engage ports 26, 30 and no fuel would be discharged from outlet 22.

As best shown in FIG. 2, the triangularly disposed ports 20, 24, 28 of the base 14 are inverted with respect to the triangularly disposed ports 22, 26, 30. By this arrangement, the inlet and outlet of the water separator 10 may be adjacent the upper edge of the base 14 so that it will not become plugged if the separated water therein should freeze, while the inlet and drain port of the filter 12 are both located adjacent the bottom of the base to minimize the choking of the filter medium of filter 12 by water and solid contaminants entering inlet 26.

As best shown in FIGS. 3 and 4, the inlet 21 of the water separator 10 is encircled by the open end of a sock-type barrier 34. The open end 35 of the illustrated sock-type barrier is sealed around the inlet 21 in any suitable manner such as by the adhesive layer 40 on the cover plate 42 which also seals the cover plate to the open end of generally rectangular cup shaped housing 44 to form a plenum chamber in which the flow of fuel is slowed down to minimal velocity.

A generally rectangular cup shaped baffle 46 is shown as being provided in the plenum chamber.

The purpose of the barrier 34 is to separate out the water particles entrained in the fuel while permitting the easy passage of the fuel. Further, since an engine must operate in cold weather, say at 0° F. where the wax components of petroleum base liquid fuels tend to coagulate into large crystal-like globules, the barrier must pass such globules so that it is not clogged under cold temperature operating conditions.

The exemplary barrier 34 fully meets these requirements.

In the exemplary embodiment, the barrier 34 takes the form of a porous cloth having, when relaxed, small pores which are readily expandable to pass wax particles entrained in the fuel. As illustrated, the barrier 34 comprises a woven cloth sock having a closed end 38. Due to the direction of liquid flow through the sock, the sock is not collapsed, despite its flexibility and lack of rigid support, and the entire porous area of the sock is continuously available for the passage of fuel. This, coupled with the large ratio of the porous area of the sock to the inlet 21, of about the order of 50:1 or more and preferably of over 200:1, results in a barrier 34 which produces a positive but minimal drop resisting the flow of liquid fuel between the upstream and downstream sides of the sock and an oozing of the fuel through the pores. This positive slowing of the flow allows gravity to act in settling out some of the water particles and solid contaminants of all sizes. Moreover, this construction, coupled with the elasticity of the sock automatically causes the pores of the sock to reach a size, in the equilibrium state, which is the minimum size which will allow the passage of fuel at the required flow rate. The elasticity of the sock also allows the pores to expand sufficiently to pass large wax particles during cold temperature operation.

Because it provides a small relaxed or normal pore size with ready expandability to pass large wax particles, the preferred embodiment of barrier 34 is formed of a ribbed-knit construction and it has been found that a 132 needle, 70 denier 2 ends, 34 filament, ribbed-knit construction is well suited for use in removing suspended water particles from fuel oil used for diesel engines.

Tests have been made of the efficiency of the separation of water from diesel fuel by such an embodiment of the invention as shown in FIG. 3, in which the sock-type barrier 34 is made of nylon.

The water separators used for the tests had housings which were 3 inches deep, had a mean width of 3 inches, a mean length of 4¾ inches, an inlet port ¼ inch in diameter, and a capacity of about 500 c.c.

The sock-type barrier 34 was of the ribbed-knit nylon construction indicated above and was made in the form of a cylinder with one end flattened and seamed. The flattened width of the cylinder, when relaxed, was 2 inches and the free length of the sock-type barrier when assembled in the water separator was about 5 inches.

Test results showed that efficiency of such a separator was surprisingly high at customary flow rates. Curve A of FIG. 5 indicates an efficiency of water separation as measured by centrifuge tests of essentially 100 percent (i.e., zero retained water) at flow rates of up to over 20 gallons per hour when the water content of the incoming fuel was about 1 percent and with a 97.5 percent efficiency at a flow rate of 30 gallons per hour.

Curve B of FIG. 5 indicates the efficiency of water separation of a commercially used water separator of approximately the same physical size. It is apparent that at a flow rate of 22½ gallons per hour, 25 percent of the water remained in the fuel after passing through the currently used commercial water separator as compared with essentially zero percent by a water separator incorporating this invention. At a flow rate of 30 gallons per hour, the water remaining in the fuel after passing through the commercial water separator was 40 percent as compared with 2½ percent for a water separator incorporating the present invention.

It is believed that very favorable results of the water separator of this invention is due to the fact that its barrier 34 effectively utilizes the differences in the surface tension of the suspended liquid particles to be removed from that of the carrier liquid.

The surface tension for any liquid acts to minimize the surface area for a given quantity of liquid. The molecules below the surface film, being equally acted on from all sides, are in equilibrium as to the force of cohesion. The surface molecules are not in such equilibrium and the result is a force acting perpendicular to the surface tending to minimize the surface.

If the quantity of liquid presented to a pore in a barrier is greater than that which will pass through the pore without distortion of the surface thereof, a force greater than its surface tension must be applied to distort the shape of the liquid in order that it may pass through the pore. The force required is equal to the work done in bringing additional molecules to the surface where they are not in equilibrium as to the forces of cohesion. Thus a droplet of liquid of larger size than the pore of the barrier through which it must pass must be distorted in order to pass through the pore, and where the pressure drop across the pore is less than that needed to distort the droplet sufficiently to pass through the pore, the droplet will not pass through the pore.

Since the surface tension of water is greater than the surface tension of a petroleum base liquid fuel, the critical pressure drop for forcing the liquid fuel through a porous barrier having pores smaller than the droplets of water, is less than it is for water. Thus, where the size of the water droplet to be separated is larger than the size of the pores and the pressure drop across the barrier is kept at a level sufficient to pass the liquid fuel but below the critical pressure drop for distorting the water droplet sufficiently to pass therethrough, the water droplet will be separated.

It has been observed that the water level of the standing water inside the sock is higher than the water level outside. This supports the above stated theory since, while water passes through the sock below the level of the outside water, the additional pressure head provided by the differences in water level and the density of the water, provides the additional force required to produce the flow.

It has been observed that small droplets of water are generated on the downstream side of the sock at selected portions of the area thereof. It is believed that these occur because of slight differences in the sizes of the pores of the barrier due to manufacturing variations, so that the critical pressure drop for the distortion of the water droplets to pass through some of the larger pores in the sock is less than for other pores of the sock. However, because of the low flow rate through the barrier due to the ratio of the porous area of the barrier to the inlet port, these water particles which pass through the pores of the sock are not broken up or emulsified. Rather they reform on the downstream side of the barrier and, because they are slowed down relative to the fuel oil in which they are entrained due to the resistance in passage through the pores and also because they are of a heavier density than the oil, they fall along a trajectory path to the bottom of the water separator.

As shown in FIG. 2 the location of the supply pump 32 downstream of the water separator 10 where it does not emulsify or break down the size of the water particles prior to their passing through the water separator 10 contributes to the effectiveness of water separator 10. Moreover, the placement of the supply pump 32 upstream of the filter 12 so that it will break up and emulsify the wax particles in the fuel enhances the passage of the wax particles through the filter 12 under low temperature conditions.

While this invention has been described in connection with the removal of suspended water particles from a petroleum base liquid, such as fuel oil, it may also have application to the removal of liquid impurities from other suspensions.

From the foregoing, it is apparent that this invention provides for the removal of suspended water particles from a petroleum base liquid fuel while permitting the passage of large wax particles under cold temperature conditions. It is also apparent that, by providing a porous barrier having pores which are readily expandable to provide a pore size which will automatically adjust to produce a relatively constant pressure drop across the barrier for different flow rates, the efficiency of separation may be substantially maintained at high flow rates.

As will be apparent to persons skilled in the art, various modifications, adaptations and variations of the foregoing specific disclosure can be made without departing from the teachings of the present invention.

I claim:

1. A permanent self-cleaning water separator for removing suspended water particles from a petroleum base liquid fuel supply for an internal combustion engine which operates under all ambient temperature conditions comprising a housing forming a plenum chamber, an inlet passage and an outlet passage for said plenum chamber, and a barrier isolating the inlet passage from the outlet passage, said barrier providing a positive but minimal resistance to the flow of liquid fuel to assure the substantially uniform deceleration of all the fuel passing through the separator, said barrier further being formed of a knitted cloth to provide pores which have a smaller normal size than the water particles to be removed from the fuel but are automatically expandable to pass solid particles which are entrained in the fuel and are larger in size than the water particles to be removed by the cloth.

2. The water separator of claim 1 wherein the housing is provided with a drain to remove the water separated by the barrier.

3. The water separator of claim 2 wherein the barrier is an elongated generally cylindrical sock having a closed end and an open end with the open end of the annular sock sealed around the inlet of the separator.

4. The water separator of claim 3 wherein the ratio of the porous area of the sock to the area of the inlet is of about the order of 200:1 or more.

5. The water separator of claim 1 where in the fabric is formed by a ribbed-knit.

6. The water separator of claim 1 wherein the fabric is formed of fibers which are nonwettable by water.

7. The water separator of claim 6 wherein the fibers are nylon.

8. The water separator of claim 1 wherein the ratio of the porous area of the barrier to the area of the inlet is of about the order of 50:1 or more.

9. A self-cleaning separator for removing immiscible liquid particles having a higher surface tension than the carrier liquid from a suspension comprising a knitted cloth barrier through which a suspension is passed, the pores of said barrier having a normal size which is smaller than the liquid particles to be removed, means for causing a pressure differential across the barrier of a level inadequate to distort the suspended particles sufficiently to pass therethrough into the separated carrier liquid of lower surface tension, and a drain for removing the suspended liquid particles from the separator, the pores of said cloth being automatically expandable to pass solid particles of a size which is larger than the liquid particles which are removed.

10. The method of removing immiscible liquid particles having a higher surface tension than the carrier liquid from a suspension including the steps of providing a barrier formed of a knitted cloth having pores of a size which is normally smaller than that of the immiscible particles to be removed, passing the suspension through the barrier and subjecting the immiscible particles to a force tending to increase their surface area but inadequate to distort the immiscible particles sufficiently to pass through the pores into the separated carrier liquid of lower surface tension, and collecting the immiscible particles.

11. The method of claim 10 wherein the barrier is nonwettable by the particles to be removed.

12. A combined water separator and filter assembly for a diesel fuel supply system comprising a water separator and a solid particle filter mounted on a common base and connected in series with the water separator positioned upstream of the solid particle filter, pumping means disposed downstream of the water separator and upstream of the filter for pumping the diesel fuel therethrough, said water separator and said filter being selectably removable from the common base and having base walls providing identically disposed ports to provide communication with passages of said base, and means on said water separator to prevent the substitution of the water separator for the filter assembly on the base.

13. The device of claim 12 wherein the last-mentioned means comprises a dimple on the base wall of the water separator and a recess is provided in the base for receiving the dimple when applied to the common base in the upstream position only.

14. The device of claim 12 wherein the ports of the water separator form inlet and outlet passages for the water separator and are disposed adjacent the upper edge thereof and the ports on the base for receiving the solid particle filter are inverted with respect to those for the separator.

References Cited

UNITED STATES PATENTS

| | | | |
|---|---|---|---|
| 3,016,345 | 1/1962 | Price | 210—73 X |
| 3,481,473 | 12/1969 | Howard | 210—316 X |
| 3,519,560 | 7/1970 | Taylor | 210—316 |
| 3,591,004 | 7/1971 | Roosa | 210—443 |
| 3,208,596 | 9/1965 | Gravert | 210—Dig. 5 |
| 1,352,961 | 9/1920 | Hills | 210—452 |

FRANK A. SPEAR, Jr., Primary Examiner

R. H. SPITZER, Assistant Examiner

U.S. Cl. X.R.

210—77, 232, 356, 499, DIG 5